US008823765B2

(12) United States Patent
Hubner et al.

(10) Patent No.: US 8,823,765 B2
(45) Date of Patent: Sep. 2, 2014

(54) METHOD AND APPARATUS FOR DEVICE PEER RESOURCE POOLING

(75) Inventors: Paul Hubner, McKinney, TX (US); Robert A. Clavenna, Lucas, TX (US); Kristopher Pate, Flower Mound, TX (US); Steven T. Archer, Dallas, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 238 days.

(21) Appl. No.: 13/249,888

(22) Filed: Sep. 30, 2011

(65) Prior Publication Data

US 2013/0083149 A1 Apr. 4, 2013

(51) Int. Cl.
*H04N 7/14* (2006.01)
*H04N 21/4223* (2011.01)
*H04N 21/2665* (2011.01)
*H04N 21/2187* (2011.01)
*H04N 21/422* (2011.01)
*H04N 21/234* (2011.01)
*H04N 21/258* (2011.01)
*H04N 21/414* (2011.01)

(52) U.S. Cl.
CPC ....... *H04N 21/2187* (2013.01); *H04N 21/4223* (2013.01); *H04N 21/2665* (2013.01); *H04N 21/42202* (2013.01); *H04N 21/23424* (2013.01); *H04N 21/25891* (2013.01); *H04N 21/41407* (2013.01)
USPC ..................... 348/14.02; 348/14.12

(58) Field of Classification Search
CPC ......... H04N 7/147; H04N 7/15; H04N 7/155; H04N 7/141; H04N 7/142; H04N 7/144
USPC ...................... 348/14.01, 14.02, 14.08, 14.12
See application file for complete search history.

(56) References Cited

U.S. PATENT DOCUMENTS

| | | | | |
|---|---|---|---|---|
| 6,577,333 | B2* | 6/2003 | Tai et al. ..................... | 348/14.08 |
| 2008/0091838 | A1* | 4/2008 | Miceli .......................... | 709/231 |
| 2008/0297589 | A1* | 12/2008 | Kurtz et al. ................. | 348/14.16 |
| 2011/0025819 | A1* | 2/2011 | Gorzynski et al. ......... | 348/14.07 |
| 2011/0249086 | A1* | 10/2011 | Guo et al. .................. | 348/14.12 |
| 2012/0092443 | A1* | 4/2012 | Mauchly .................... | 348/14.12 |

* cited by examiner

*Primary Examiner* — Quoc D Tran (57) ABSTRACT

An approach is provided for generating a composite signal. A plurality of media signals are received over a wireless communication network from a plurality of mobile devices. One or more of the received media signals are selected according to a criterion. A composite signal is generated from the selected media signals.

16 Claims, 8 Drawing Sheets

METHOD AND APPARATUS FOR DEVICE PEER RESOURCE POOLING

BACKGROUND

Consumer adoption of mobile devices, such as cellular telephones, laptop computers, personal digital assistants, and the like, is increasing. These devices often have the capability to transmit and capture multimedia such as sound and video. Additional enhancements such as location or movement information, e.g., global positioning system (GPS) tracking and accelerometer readings, may enable device users to monitor device position and present the location via a display. Accordingly, such capabilities may be used to capture multimedia content (e.g., videos, images, audio, etc.) for any number of uses such as recording an event, audio/video conferencing, and the like. Moreover, with the number of devices capable of capturing multimedia content increasing, it is often the case that more than one device is present to capture an event or at when otherwise operating in a group setting.

Therefore, there is a need for an approach that can efficiently and effectively coordinate multimedia capture over multiple devices.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF SOME EMBODIMENTS

A preferred apparatus, method, and software for providing device peer resource (e.g., multimedia resources) pooling are described. In the following description, for the purposes of explanation, numerous specific details are set forth in order to provide a thorough understanding of the preferred embodiments of the invention. It is apparent, however, that the preferred embodiments may be practices without these specific details or with an equivalent arrangement. In other instances, well-known structures and devices are shown in block diagram form in order to avoid unnecessarily obscuring the preferred embodiments of the invention.

Although various exemplary embodiments are described with respect to forming composite signals from a plurality of media signals, it is contemplated that various exemplary embodiments are also applicable to stationary devices as well as other applications.

Figure 1:
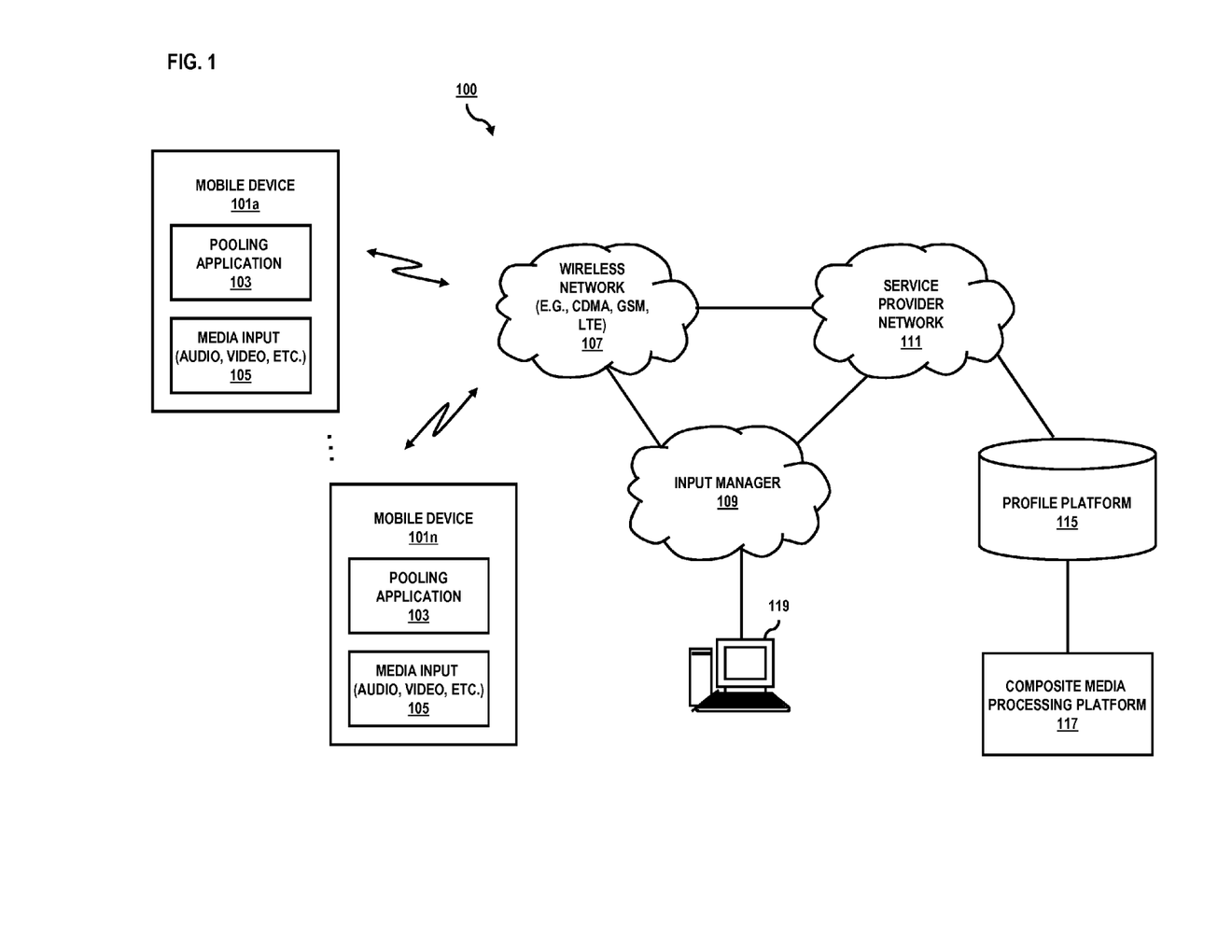
FIG. 1 is a diagram of a system configured to generate a composite signal from a plurality of media signals, according to one embodiment.

FIG. 1 is a diagram of a system capable of generating a composite signal from a plurality of media signals, according to one embodiment. For the purpose of illustration, a system 100 for generating a composite signal from media signals (e.g., signals carrying videos, images, audio, etc.) from multiple mobile devices 101, such as one or more cellular phones, is described with respect to an input manager (or manager) 109. According to certain embodiments, users via client devices (e.g. mobile devices 101) may access the features and functionalities of the manager 109 over one or more networks, such as wireless network 107 and/or service provider network 111, in order to generate a composite signal from mobile device media signals when, for instance, available conferencing set-up is insufficient or inadequate. Additionally (or alternatively), the manager 109 may enable users to remotely control mobile devices 101 in order to, for example, actively select media signals, capture signals from an interface (e.g., audio interface, imaging interface, etc.), configure (or reconfigure) functions, terminate services, etc., or of associated with devices 101. While specific reference will be made thereto, it is contemplated that system 100 may embody many forms and include multiple and/or alternative components and facilities.

It is noted that devices with multiple capabilities to transmit and capture multimedia or location and movement information are often present, but not utilized in group settings (e.g., conferences, group events, etc.). Traditionally in group settings, users rely on pre-set conferencing systems or a single device, rather than pooling capabilities of devices that may be present. As a result, these pre-set systems or single devices often cannot provide adequate coverage of the group event or setting because the user is typically relying on a single capture device. In other words, with a single device, there may not be adequate microphone or camera placement to cover an event or setting. For example, in a video conference, a single device may not be able to provide images of all participants or capture their voices for transmission. Moreover, the conferencing systems or single devices may not permit alternative composites to suit various user preferences and needs. Consequently, service providers face significant technical challenges to enabling effective and efficient techniques to generate composite signals, such as for the purpose of capturing a conference session or joining outside participants not physically present in a session.

To address this problem, the system 100 introduces the capability to pool the resources (e.g., media capturing resources) of multiple devices 101 that have traditionally operated in a singular manner. In one embodiment, the system 100 pools the resources of the devices 101 into one or more meta devices (e.g., selected from among the multiple devices 101) that is capable of not only providing improved media capturing capabilities, but also capable of utilizing the resources or capabilities of the other devices to provide an enhanced experience. By way of example, with the available of onboard sensors (e.g., location sensors, accelerometers, gyroscopes, etc.) in the devices 101, the designated meta device can provide additional functionality such as the capability to build a three-dimensional landscape/soundscape or a group event, setting, meeting, etc. In some embodiments, even devices 101 on disparate communication networks can still pool resources through wireless technologies such as WiFi, near filed communications (NFC), short range wireless, etc.

Therefore, the approach of system 100, according to certain exemplary embodiments, stems from the recognition that consumers can benefit from composite signals, whereby users (or subscribers) are given access to a manager 109 for activating at least one application on their devices 101, such as one or more smartphone devices, for transmitting and/or receiving media signals (e.g., media signals) from these devices 101. For instance, users may access the manager 109 for activating an application 103 on a mobile device 101 for controlling an audio interface (e.g., a microphone) and/or an imaging interface (e.g., a camera) of the mobile device 101 to capture one or more media signals. Captured signals may relate to acoustic and/or visual indicia of an environment surrounding the mobile device 101, which may be utilized by a remote user to enhance the received media signal or supplement another media signal.

In other instances, activating an application 103 on the mobile device 101 may cause the mobile device 101 to return spatial positioning information (e.g., an address, latitude, longitude, elevation, etc.) corresponding to a location of the device 101. This spatial positioning information may be overlaid on, for instance, a depiction of a geographic area such that a user or remote user may facilitate manipulation of a device 101 to a position where signals (e.g., signals carrying media content) may be better captured. Users may also be given access to the manager 109 to remotely activate at least one application 103 on their device to control or configure one or more features of the device 101. For example, an application 103 may be remotely activated to re-select media signals to be transmitted, to image (or backup) a memory of a mobile device 101, as well as store the image to, for instance, a networked repository (e.g., composite media processing platform 117). Users may also be enabled to erase a memory of the mobile device 101, such as for the purpose of saving memory space, especially for lengthy capture sessions. Still further, an application 103 may be activated in order to configure features of or services available to the mobile device 101, such as to monitor or deactivate an ability of the mobile device 101 to transmit and receive information. For instance, if media signal from one mobile device 101 is no longer favorable or desired, the application may deactivate capture from the mobile device 101 in order to save resources. In a further embodiment, the application 103 may continue to monitor the mobile device 101 in order to re-activate capture of media signal once circumstances become favorable or desired for sampling from that mobile device 101. In some embodiments, activation may be remote activation.

To this end, system 100 may receive multiple media signals and pool devices 101 to obtain a set of pooled resources. In one instance, pooling application 103 may prompt manager 109 to poll mobile device 101 specifications in order to select particular capabilities of each device 101. For example, various devices 101 may produce signals of varying qualities for different types of media. Manager 109 may select the best capability (or capability meeting a defined threshold) of each device 101 to generate a signal. In one embodiment, the system 100 may select the best video device 101 and the best audio device 101 to receive signals from, then integrate the received signals to make the highest quality pooled, composite signal.

In one scenario, users may employ system 100 to record a conversation for later review. In this scenario, the system 100 may gather media signals from mobile devices 101 to receive media signals from various locations surrounding the users or devices 101, then pool the signals into a composite signal. By sampling from multiple devices 101, various parts of the conversation may be captured with clarity. Manager 109 may then generate a composite of the various inputs, permitting a recording with comprehensive clarity. In one instance of this scenario, manager 109 may further process the audio input to distinguish between multiple conversations and separate out conversations. Furthermore, manager 109 may process the input to mask noise from conversations to enhance certain inputs over others.

In another scenario, system 100 may compose the composite signal in real time, permitting a remote user to participate in or otherwise access a meeting or event as it takes place. In another embodiment, system 100 may receive video signal from multiple devices 101 to generate a three-dimensional composite representation, enabling a remote user to participate using, for instance, virtual reality or other virtual presence technology. In such a case, the representation may be streamed, for instance, online over a data network.

As seen in FIG. 1, mobile devices 101 provide media input 105 for generating composite signals. Accordingly, in some embodiments, system 100 generates a composite signal by enabling users and their respective mobile devices 101 to access manager 109 via one or more client devices (e.g. respective mobile devices 101 and/or computing device 119) to register to the services of system 100 that enable receipt of the media signals, as well as to create, customize, and manage one or more user profiles stored to, for example, profile platform 115 or any other suitable storage location of (or accessible to) the components or facilities of system 100. For example, users may use pooling application 103 installed on their respective mobile devices 101 to initiate manager 109 activity. In doing so, manager 109 may detect mobile device 101 media signals and prepare to receive and process media signals from multiple mobile devices 101. In one scenario, manager 109 may generate one or more control signals to activate one or more applications on mobile devices 101 (e.g. media input 105) for controlling, configuring, and/or monitoring media signals from devices 101.

According to one embodiment, control signals may also be utilized to control an audio interface (e.g., a microphone) or an imaging interface (e.g., a camera) of mobile device 101 to capture one or more signals from the audio interface or the imaging interface. Captured signals may relate to acoustic and/or visual indicia of an environment surrounding mobile device 101, which may be utilized by a user to complete a composite signal. Control signals may be transmitted to mobile devices 101 over one or more of networks 107 and/or 111, such as transmitted over one or more of networks 107 and/or 111. It is noted that manager 109 is described in more detail in accordance with FIG. 2.

In certain exemplary embodiments, access to manager 109 may be obtained via any suitable portal interface, such as a voice portal or a web portal. For example, audio inputs 105 and/or video inputs 105 of mobile devices 101 may be networked remote applications which are deployed via manager 109 to implement the portal. However, it is contemplated that another facility or component of system 100, such as a frontend, middleware, or backend server, may deploy remote application and, consequently, interface with manager 109. As such, it is contemplated that applications for media input 105 may be implemented on one or more of client devices 101 and, thereby, configured to interface with manager 109. In certain embodiments, one or more applications may function in conjunction with one another to achieve the features and functionalities of system 100, such as one or more of the processes described herein for controlling mobile devices 101.

The portal may include or provide users with the ability to access, configure, manage, and store user profile information to profile platform 115, as well as the ability to control, configure, monitor, and/or track their mobile devices 101. As such, manager 109 may be configured to receive or retrieve media signal information and tracking content from mobile devices 101 and, thereby, store this tracking content to, for example, composite media processing platform 117. It is contemplated that tracking content may be additionally (or alternatively) stored to any other suitable storage location or memory of (or accessible to) the components or facilities of system 100. Further, media signal information and tracking content may generally relate to any signals or information retrieved (or received) from mobile devices 101 that have been (or currently are being) remotely controlled, configured, monitored, tracked, etc.

In one embodiment, the profile platform 115 may include user profile information in addition to composite-enhancing information, such as voice or speech recognition. In this manner, the profile platform 115 may not only process media signals according to user preference information set by users, but also according to heuristics that may provide a composite with increased definition. For example, in the scenario of capturing a conference, voice or speech recognition capabilities stored in profile platform 115 may add distinction between various voices and improve clarity in the captured conversation.

The composite media processing platform 117 may provide further means for manipulating the media signal input, as well as additional processing of the composite signal. For example, the composite media processing platform may generate control signals to cause mobile device 101 to return spatial positioning information (e.g., an address, latitude, longitude, elevation, etc.) corresponding to a location of mobile device 101 so that remote users may direct mobile device 101 to be shifted to better capture positions. Accordingly, mobile device 101 may be configured to determine corresponding spatial positioning information through conventional satellite positioning system (SPS) technology, such as GPS technology; however, any suitable navigational or location determination technology may be utilized, such as advanced forward link trilateration (A-FLT), assisted-GPS (A-GPS), enhanced cellular identification (CELL-ID), wireless area network (WLAN) positioning, etc. Composite media processing platform 117 may also "poll" or receive such spatial positioning information from mobile devices 101 in real-time, so as to provide presence service features related to mobile devices 101. As such, the location of, for instance, mobile device 101 may be detected without mobile device 101 having to initiate a phone call or other like communication session. Thus, composite media processing platform 117 may be configured to present received and/or retrieved spatial positioning information to users, such as via one or more graphical user interfaces (GUI). It is also noted that spatial positioning information may be stored to user profiles repository 215 or any other suitable storage location or memory of (or accessible to) system 100.

Accordingly, manager 109, profile platform 115, and/or composite media processing platform 117 may be configured to issue control signals via various bearers to mobile devices 101, such as in the form of one or more call control setup messages, short messaging service (SMS) messages, enhanced messaging service (EMS) messages, multimedia messaging service (MMS) messages, electronic mail, files, or any other suitable bearer, as well as any suitable combination thereof. In particular implementations, these bearer mediums may include control signals in various forms, including attention (AT) commands, menu traversal paths, function codes, voice data, dual-tone multi-frequency (DTMF) signals, scripts, strings, parameters, object variables, and the like. It is noted that these control signals can be used in lieu of "software code," and therefore, may be directly integrated into the control logic of mobile device 101, thereby requiring less processing and hence, less power. It is contemplated, however, that coded instructions may also be utilized. As such, these control signals may be utilized by pooling application 103 to facilitate the transfer of media signals from mobile devices 101.

According to exemplary embodiments, pooling application 103 of mobile devices 101 may include, for example, a binary runtime environment for wireless (BREW) platform, for receiving control signals from manager 109, profile platform 115, and/or composite media processing platform 117 and, thereby, for being remotely activated, controlled, configured, monitored, tracked, etc., by manager 109, profile platform 115, and/or composite media processing platform 117. It is contemplated, however, that one or more other mobile client applications may be utilized, such as one or more applications written in one or more programming languages, such as C, C++, J2ME, Java, etc. As such, pooling application 103 may be configured to, in response to control signals being received from, for instance, manager 109, enable one or more signals to be captured from media input 105, such as an audio interface (e.g., a microphone) or an imaging interface (e.g., a camera) of mobile device 101. These signals may relate to acoustic(s) or image(s) of an environment surrounding mobile device 101. In other instances, pooling application 103 may determine spatial positioning, backup or erase a memory (not shown), configure (or reconfigure) functions, obtain usage logs, terminate services, etc., of or associated with mobile devices 101.

As seen in FIG. 1, service provider network 111 enables client devices 101 to access the features and functionality of manager 109 via one or more of networks 107 and 111. Networks 107 and 111 may be any suitable wireline and/or wireless network. For example, wireless network 107 may employ various technologies including, for example, code division multiple access (CDMA), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, and the like.

Although depicted as separate entities, networks 107 and 111 may be completely or partially contained within one another, or may embody one or more of the aforementioned infrastructures. For instance, service provider network 111 may embody circuit-switched and/or packet-switched networks that include facilities to provide for transport of circuit-switched and/or packet-based communications. It is further contemplated that networks 107 and 111 may include components and facilities to provide for signaling and/or bearer communications between the various components or facilities of system 100. In this manner, networks 107 and 111 may embody or include portions of a signaling system 7 (SS7) network, or other suitable infrastructure to support control and signaling functions. As such, the conjunction of networks 107 and 111 may be adapted to facilitate the composite signal generation services of system 100.

While system 100 has been described in accordance with the depicted embodiment of FIG. 1, it is contemplated that system 100 may embody many forms and include multiple and/or alternative components and facilities.

Figure 2:
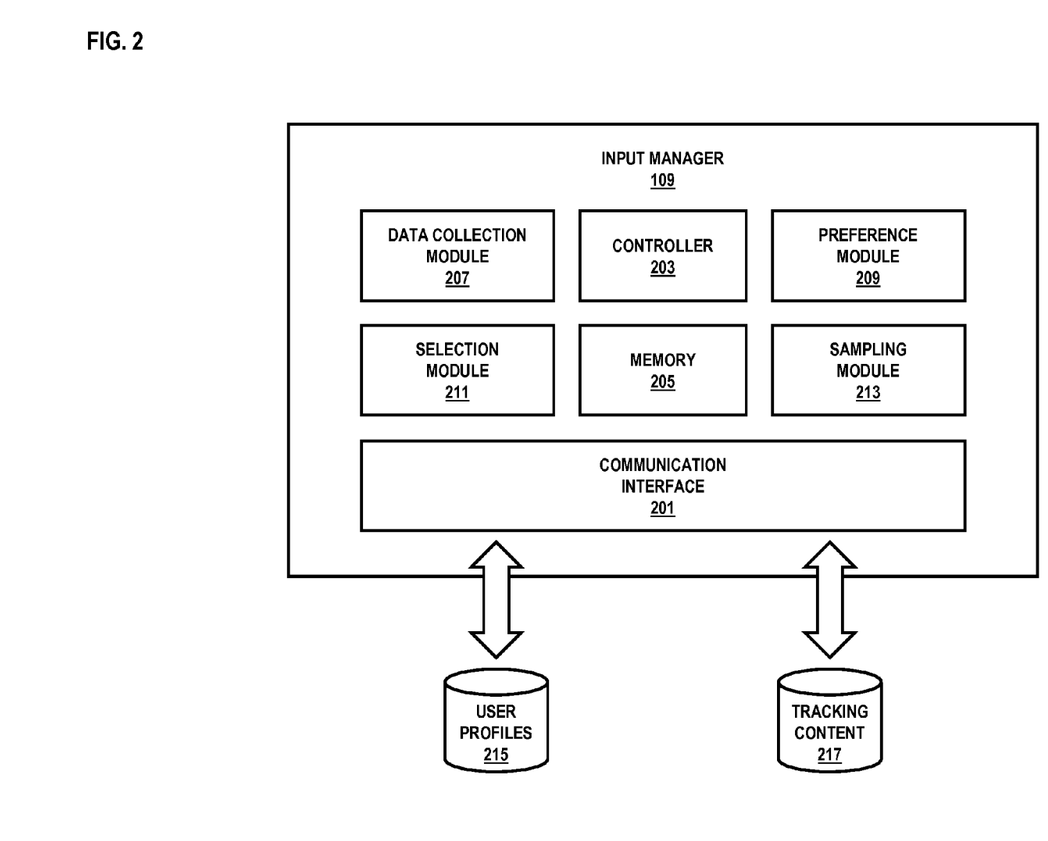
FIG. 2 is a diagram of the components of a manager capable of generating the composite signal, according to one embodiment.

FIG. 2 is a diagram of an input manager 109 capable of providing a composite signal, according to one embodiment. Input manager (or manager) 109 may comprise computing hardware (such as described with respect to FIG. 8), as well as one or more components configured to execute the processes described herein for providing the composite signal of system 100. In one implementation, manager 109 includes communication interface 201, controller (or processor) 203, memory 205, data collection module 207, preference module 209, selection module 211, and sampling module 213. Manager 109 may also communicate with one or more repositories, such as user profiles repository 215 and tracking content repository 217. Users may access manager 109 (or the features and functionality provided thereby) via mobile devices 101. While specific reference will be made to this particular implementation, it is also contemplated that manager 109 may embody many forms and include multiple and/or alternative components. For example, it is contemplated that the components of manager 109 may be combined, located in separate structures, or separate locations.

According to one embodiment, manager 109 embodies one or more application servers accessible to mobile devices 101 over one or more networks 107 and 111. Users (or subscribers) can access manager 109 to create, customize, and manage one or more user profiles (such as for the purpose of registering mobile devices 101 with the composite signal generation service of system 100), as well as for remotely controlling and tracking one or more of these registered mobile devices 101. As such, manager 109 may provide a user interface, e.g., web portal or other networked application, to permit user to access the features and functionality of manager 109 via mobile devices 101. According to certain embodiments, preference module 209 may be configured for exchanging information between mobile devices 101 and a web browser or other network-based application or system, such as a voice browser or interactive voice recognition system.

In exemplary embodiments, data collection module 207 is configured to determine the media signals available for collection from each mobile device 101. In one embodiment, the data collection module determines the possible media signals by detecting the model of each mobile device 101. From detecting the model of each mobile device 101, data collection module 207 may determine via the wireless network 107, specifications of mobile devices 101 to ascertain the possible media signal contribution from each mobile device 101.

Accordingly, preference module 209 may be configured to execute one or more GUIs that are configured to provide users with one or more menus of options for creating, customizing, and managing user profiles, as well as engaging with the other features and functionalities of the composite signal generation services of system 100, such as to enable users to determine composite signal preferences. Composite signal preferences may include, at least in part, characteristics such as lighting specifications, sound quality, or a combination thereof. In some embodiments, the composite signal preferences may be set by users in advance as part of a user profile. Additionally (or alternatively), preference module 209 may enable users to remotely control mobile devices 101 in order to, for example, backup or erase a memory (not shown), capture signals from an interface (e.g., audio interface, imaging interface, etc.), configure (or reconfigure) functions, obtain usage logs, terminate services, etc., of or associated with these devices 101. As previously mentioned, an exemplary GUI is described in more detail in accordance with FIG. 7.

In this manner, preference module 209 (via communication interface 201) may be configured to send requests for remotely controlling, configuring, monitoring, tracking, etc., mobile devices 101. For example, a user may access manager 109 via a suitable client device to remotely transmit a plurality of media signals from their mobile device 101. As in, the user may submit a corresponding request to track mobile device 101 and, in response thereto, preference module 209 may port the request to selection module 211 to transmit media signals suitable for generating a composite signal that fits user preferences.

Additionally (or alternately), selection module 211 may define one or more criteria to perform a selection of media signals from the available mobile devices 101. Selection module 211 may be configured to receive the media signals from mobile devices 101 and compare the media signals against a criterion. In some embodiments, the criteria may be pre-set and/or independent from subscriber or user selection. Criteria may include, at least in part, camera type, focal length, microphone quantity, Global Positioning System (GPS) sensitivity, accelerometer, or a combination thereof. In a further embodiment, the criteria may form thresholds or baselines by which media signals are selected. For example, selection module 211 may pick an audio signal of a particular mobile device 101a for sampling because mobile device 101a is detected to have more microphones than an exemplary pre-set criterion entailing a requisite quantity of two microphones.

Next, sampling module 213 may be configured to generate one or more control signals configured to remotely activate one or more applications on mobile device 101. The control signals may further be configured to control an audio interface or an imaging interface of mobile device 101, such as to remotely capture one or more signals from the audio interface or the imaging interface to be used toward the composite signal. In this manner, sampling module 213 via, for example, communication interface 201, may also be configured to transmit generated control signal(s) to mobile device 101, such as over one or more communication networks 107 or 111 and, in response thereto, configured to receive one or more captured signal(s) from mobile device 101. As will become more apparent below, sampling module 213, via communication interface 201, may also be configured to receive other information from mobile device 101, such as spatial positioning information relating to a location of mobile device 101, an image of a memory of mobile device 101, a usage log of mobile device 101, etc.

According to exemplary embodiments, sampling module 213 may be configured to generate media signals for transmission from the mobile devices 101 to the wireless network 107 utilizing any suitable bearer, such one or more call control setup messages, short messaging service (SMS) messages, enhanced messaging service (EMS) messages, multimedia messaging service (MMS) messages, electronic mail, files, or any other suitable bearer, as well as any suitable combination thereof. In particular implementations, these bearer mediums may include control signals in various forms, including attention (AT) commands, menu traversal paths, function codes, voice data, dual-tone multi-frequency (DTMF) signals, scripts, strings, parameters, object variables, and the like. It is noted that these control signals can be used in lieu of "software code," and therefore, may be directly integrated into the control logic of mobile device 101, thereby requiring less processing and hence, less power. It is contemplated, however, that coded instructions may also be utilized.

It is also contemplated that these control signals and/or bearers may be application programming interface (API) directed, such as BREW directed.

In a further embodiment, sampling module 213 may further receive and, thereby, track real-time spatial positioning information from corresponding mobile devices 101. Additionally, sampling module 213 may "poll" mobile devices 101 for spatial positioning information, as well as capture presence information or availability of mobile devices 101. An exemplary model for presence determination is detailed in Internet Engineering Task Force (IETF) Request for Comment (RFC) 2778, which is incorporated herein by reference in its entirety. According to certain exemplary embodiments, the presence or availability of mobile devices 101 may be utilized to determine whether control signals may be transmitted to or from mobile devices 101, as well provide users with additional information to position mobile devices 101.

In this manner, captured signals and/or information received from mobile devices 101 may be stored to tracking content repository 217 or any other suitable storage location or memory of (or accessible to) manager 109, such as memory 205. This tracking content may also be ported to wireless network 107 for presentation to users via the one or more GUIs as part of the composite signal. It is noted that this tracking content may relate to signals captured from an audio interface (e.g., a microphone) or an imaging interface (e.g., a camera) of mobile device 101, spatial positioning information relating to a location of mobile device 101, a device usage log corresponding to use of mobile device 101, an image of a memory of mobile device 101, etc., as well as any other suitable content that may facilitate the understanding the position of mobile devices 101.

According to exemplary embodiments, presenting tracking content to users enables users to determine locations of devices 101 in order to enhance the composite signal. As such, sampling module 213 may be configured to convey the location (or spatial position) of a mobile device 101 to user, which may be provided as a short or multimedia message or provided within an automated or personnel-based voice call. In certain embodiments, the spatial position or location of a mobile device 101 may be overlaid on a topical depiction (or map) of a cartographic or geographic area, such that pinpointing the location of mobile device 101 can be quickly ascertained.

In order to provide selective access to the features and functionality of manager 109, manager 109 may also include an authentication module (not illustrated) for authenticating (or authorizing) users to manager 109. It is contemplated that the authentication module may operate in concert with communication interface 201. That is, the authentication module may verify user provided credential information acquired via communication interface 201 and/or corresponding credential information stored within a user profile of, for instance, user profiles repository 215. By way of example, the credential information may include "log on" information corresponding to a user name, password, coded key, or other unique identification parameter, such a personal identification number (PIN). In other instances, the credential information may include any one or combination of a birth date, an account number (e.g., bank, credit card, billing code, etc.), a social security number (SSN), an address (e.g., work, home, internet protocol (IP), media access control (MAC), port, etc.), or telephone listing (e.g., work, home, cellular, etc.), as well as any other form of uniquely identifiable datum, e.g., bearer tag identifier, biometric code, voice print, etc. Users may provide this information via mobile devices 101, such as by spoken utterances, dual-tone multi-frequency (DTMF) signals, packetized transmission, etc. It is contemplated that unobtrusive security may be provided by positively identifying and screening users based on one or more of the aforementioned credentials which may be seamlessly provided when mobile devices 101 communicate with manager 109, such as a unique IP or MAC address. Other unobtrusive measures can be made available via voice prints, etc.

Additionally, manager 109 may include one or more controllers (or processors) 203 for effectuating the aforementioned features and functionality of the remote control and tracking services of system 100, as well as one or more memories 205 for permanent and/or temporary storage of one or more of the aforementioned variables, parameters, information, signals, etc. In this manner, the features and functionalities of pooling application 103 may be executed by controller(s) 203 and/or memories 205, such as in conjunction with one or more of the various components of manager 109.

Figure 3:
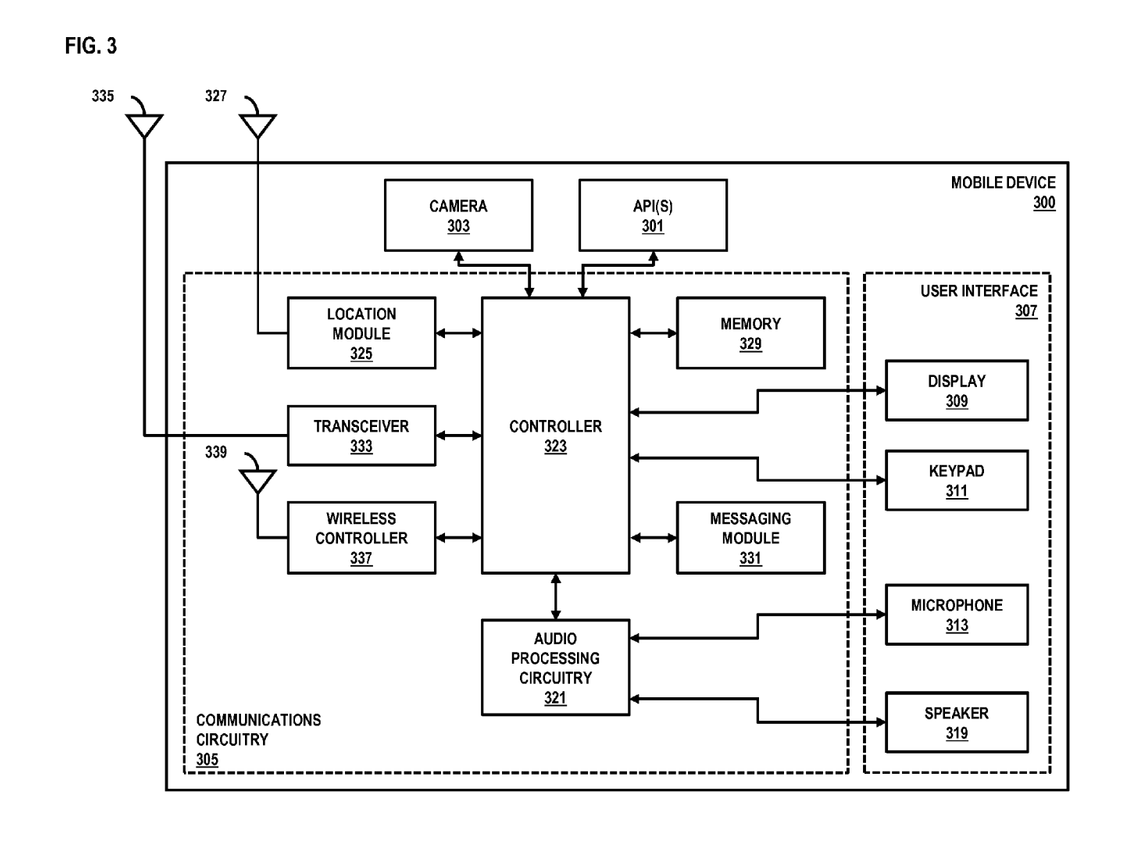
FIG. 3 is a diagram of a mobile device configured to facilitate remote control for generation of the composite signal, according to an exemplary embodiment.

FIG. 3 is a diagram of a mobile device configured to facilitate selecting media signals to generate a composite signal, according to one embodiment. Mobile device 300 may comprise of computing hardware (such as described with respect to FIG. 8), as well as include one or more components configured to execute the processes described herein for facilitating selecting media signals to generate a composite signal of system 100. In this example, mobile device 300 includes application programming interface(s) 301, camera 303, communications circuitry 305, and user interface 307. While specific reference will be made hereto, it is contemplated that mobile device 300 may embody many forms and include multiple and/or alternative components.

According to exemplary embodiments, user interface 307 may include one or more displays 309, keypads 311, microphones 313, and/or speakers 319. Display 309 provides a GUI that permits a user of mobile device 300 to view dialed digits, call status, menu options, and other service information. The GUI may include icons and menus, as well as other text and symbols. Keypad 311 includes an alphanumeric keypad and may represent other input controls, such as one or more button controls, dials, joysticks, touch panels, etc. The user thus can construct user profiles, enter commands, initialize applications, input remote addresses, select options from menu systems, and the like. Microphone 313 coverts spoken utterances of a user (or other auditory sounds, e.g., environmental sounds) into electronic audio signals, whereas speaker 319 converts audio signals into audible sounds.

Communications circuitry 305 may include audio processing circuitry 321, controller 323, location module 325 (such as a GPS receiver) coupled to antenna 327, memory 329, messaging module 331, transceiver 333 coupled to antenna 335, and wireless controller 337 coupled to antenna 339. Memory 329 may represent a hierarchy of memory, which may include both random access memory (RAM) and read-only memory (ROM). Computer program instructions and corresponding data for operation can be stored in non-volatile memory, such as erasable programmable read-only memory (EPROM), electrically erasable programmable read-only memory (EEPROM), and/or flash memory. Memory 329 may be implemented as one or more discrete devices, stacked devices, or integrated with controller 323. Memory 329 may store information, such as one or more user profiles, one or more user defined policies, one or more contact lists, personal information, sensitive information, work related information, etc.

Additionally, it is contemplated that mobile device 300 may also include one or more applications and, thereby, may store (via memory 329) data associated with these applications for providing users with browsing functions, business functions, calendar functions, communication functions, contact managing functions, data editing (e.g., database, word processing, spreadsheets, etc.) functions, financial functions, gaming functions, imaging functions, messaging (e.g., electronic mail, IM, MMS, SMS, etc.) functions, multimedia functions, service functions, storage functions, synchronization functions, task managing functions, querying functions, and the like. As such, control signals received by mobile device 300 from, for example, platform 117 may be utilized by API(s) 301 and/or controller 323 to facilitate remotely configuring, modifying, and/or utilizing one or more features, options, settings, etc., of these applications. It is also contemplated that these (or other) control signals may be utilized by controller 323 to facilitate remotely backing up and/or erasing data associated with these applications. In other instances, the control signals may cause mobile device 300 to become completely or partially deactivated or otherwise inoperable.

Accordingly, controller 323 controls the operation of mobile station 300, such as in response to commands received from API(s) 301 and/or data stored to memory 329. Control functions may be implemented in a single controller or via multiple controllers. Suitable controllers 323 may include, for example, both general purpose and special purpose controllers and digital signal processors. Controller 323 may interface with audio processing circuitry 321, which provides basic analog output signals to speaker 319 and receives analog audio inputs from microphone 313. In exemplary embodiments, controller 323 may be controlled by API(s) 301 in order to capture signals from camera 303 or microphone 313 in response to control signals received from platform 117. In other instances, controller 323 may be controlled by API(s) 301 to cause location module 325 to determine spatial positioning information corresponding to a location of mobile device 300. Still further, controller 323 may be controlled by API(s) 301 to image (e.g., backup) and/or erase memory 329, to configure (or reconfigure) functions of mobile device 300, to track and generate device usage logs, or to terminate services available to mobile device 300. It is noted that captured signals, device usage logs, memory images, spatial positioning information, and the like, may be transmitted to platform 117 via transceiver 333 and/or wireless controller 337. In this manner, the captured signals and/or other forms of information may be presented to users and stored to one or more networked storage locations, such as user profiles repository 215, tracking content repository 217, or any other suitable storage location or memory of (or accessible to) the components and facilities of system 100.

It is noted that real time spatial positioning information may be obtained or determined via location module 325 using, for instance, satellite positioning system technology, such as GPS technology. In this way, location module 325 can behave as (or substantially similar to) a GPS receiver. Thus, mobile device 300 employs location module 325 to communicate satellites. These satellites transmit very low power interference and jamming resistant signals received by GPS receivers 325 via, for example, antennas 327. At any point on Earth, GPS receiver 325 can receive signals from multiple satellites, such as six to eleven. Specifically, GPS receiver 325 may determine three-dimensional geolocation (or spatial positioning information) from signals obtained from at least four satellites. Measurements from strategically positioned satellite tracking and monitoring stations are incorporated into orbital models for each satellite to compute precise orbital or clock data. Accordingly, GPS signals may be transmitted over two spread spectrum microwave carrier signals that can be shared by GPS satellites. Thus, if mobile device 300 is able to identify signals from at least four satellites, receivers 325 may decode the ephemeris and clock data, determine the pseudo range for each satellite and, thereby, compute the spatial positioning of a receiving antenna 327. With GPS technology, mobile device 300 can determine its spatial position with great accuracy and convenience. It is contemplated, however, that location module 325 may utilize one or more other location determination technologies, such as advanced forward link triangulation (AFLT), angle of arrival (AOA), assisted GPS (A-GPS), cell identification (cell ID), observed time difference of arrival (OTDOA), enhanced observed time of difference (E-OTD), enhanced forward link trilateration (EFLT), network multipath analysis, and the like.

Mobile device 300 also includes messaging module 331 that is configured to receive, transmit, and/or process messages (e.g., EMS messages, SMS messages, MMS messages, IM messages, electronic mail messages, and/or any other suitable message) received from (or transmitted to) manager 109, profile platform 115, composite media processing platform 117 or and/or any other suitable component or facility of system 100. As previously mentioned, platform 117 may transmit control singles to mobile device 300 in the form of one or more API 301 directed messages, e.g., one or more BREW directed SMS messages. As such, messaging module 331 may be configured to identify such messages, as well as activate API(s) 301, in response thereto. Furthermore, messaging module 331 may be further configured to parse control signals from these messages and, thereby, port parsed control signals to corresponding components of mobile device 300, such as API(s) 301, controller 323, location module 325, memory 329, transceiver 333, wireless controller 337, etc., for implementation.

According to exemplary embodiments, API(s) 301 (once activated) is configured to effectuate the implementation of the control signals received from manager 109. It is noted that the control signals are utilized by API(s) 301 to, for instance, remotely control, configure, monitor, track, and/or capture signals from (or related to) media input 105, communications circuitry 305, and/or user interface 307. In this manner, visual and/or acoustic indicia pertaining to an environment surrounding mobile device 300 may captured by API(s) 301 controlling camera 303 and microphone 313. Other control signals to cause mobile device 300 to determine spatial positioning information, to image and/or erase memory 329, to configure (or reconfigure) functions, to track and generate device usage logs, or to terminate services, may also be carried out via API(s) 301. As such, one or more signals captured from camera 303 or microphone 313, or device usage logs, memory images, spatial positioning information, etc., may be transmitted to composite media processing platform 117 via transceiver 333 and/or wireless controller 337, in response to corresponding control signals provided to transceiver 333 and/or wireless controller 337 by API(s) 301. Thus, captured signals and/or one or more other forms of information provided to manager 109 may be processed to form composite signals.

It is also noted that mobile device 300 can be equipped with wireless controller 337 to communicate with a wireless headset (not shown) or other wireless network. The headset can employ any number of standard radio technologies to communicate with wireless controller 337; for example, the headset can be BLUETOOTH enabled. It is contemplated that other equivalent short range radio technology and protocols can be utilized. While mobile device 300 has been described in accordance with the depicted embodiment of FIG. 3, it is contemplated that mobile device 300 may embody many forms and include multiple and/or alternative components.

Figure 4:
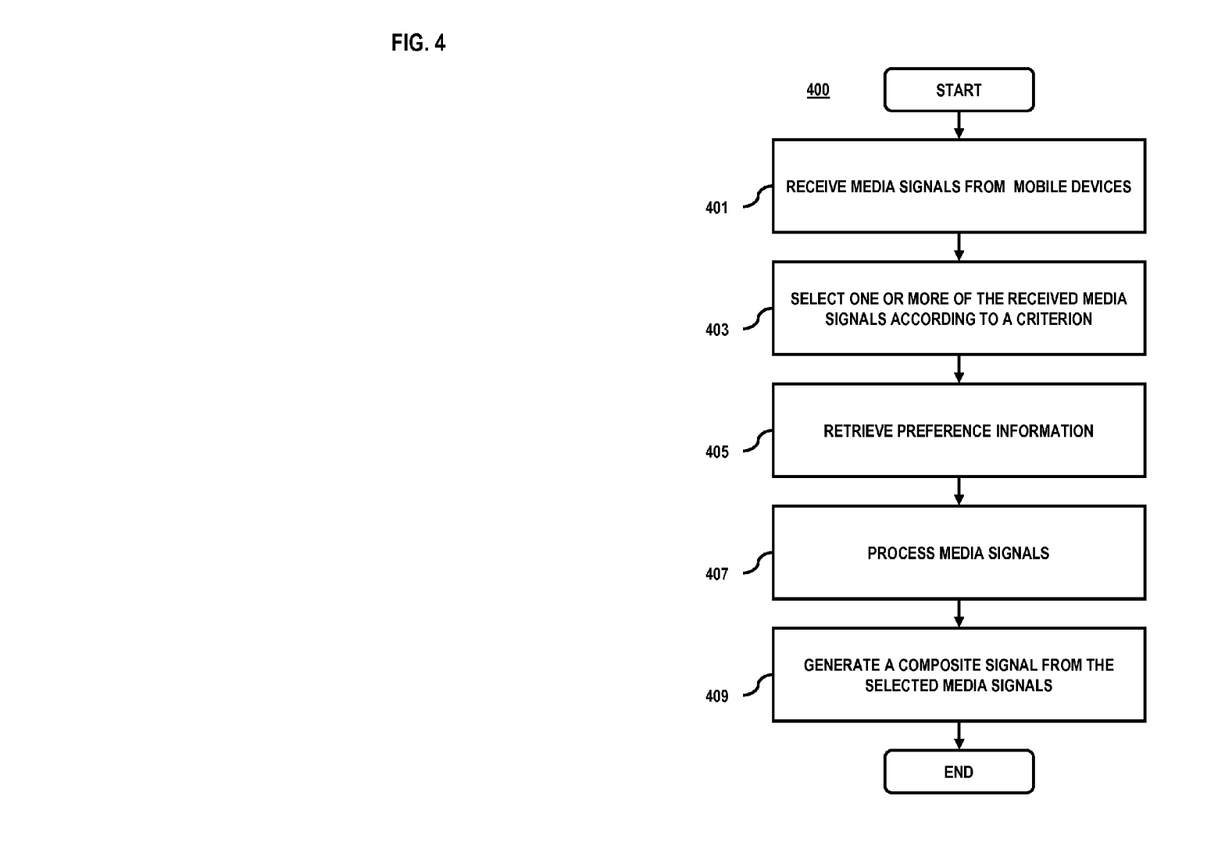
FIG. 4 is a flowchart of a process for generating a composite signal, according to an exemplary embodiment.

FIG. 4 is a flowchart of a process 400 for selecting media signals for generating a composite signal, according to an exemplary embodiment. For illustrative purposes, the process is described with respect to FIGS. 1 and 2. It is noted that the steps of the process may be performed in any suitable order, as well as combined or separated in any suitable manner. At step 401, manager 109 may receive a plurality of media signals over a wireless communication network 107 from a plurality of mobile devices 101.

At step 403, selection module 211 may select one or more of the received media signals according to a criterion. Criterion may be provided by preference module 209, profile platform 115, and/or composite media processing platform 117 and include, at least in part, camera type, focal length, microphone quantity, Global Positioning System (GPS) sensitivity, accelerometer, or a combination thereof.

With step 405, the preference module 209 may retrieve preference information from the user profiles repository 215 via the communication interface 201. To do so, in one embodiment, the manager 109 may present the composite signal to the profile platform 115 and/or composite media processing platform 117 to process one or more of the received media signals for form the composite signal. In one embodiment, the profile platform 115 and/or composite media processing platform 117 are communication devices separate from the plurality of mobile devices 101. In one scenario, the profile platform 115 and/or composite media processing platform 117 may work in conjunction with the preference module 209, tracking content 217, and user profiles repository 215, via the communication interface 201 to establish more tailored composite signal generation. For instance, the profile platform 115 may include speech recognition or voice recognition services that may enhance the composite signal.

Furthermore, the manager 109 may receive input from the profile platform 115, wherein the input is utilized to select one or more of the media signals. Continuing from the discussion above, in the scenario of recording a conversation, speech or voice recognition services from profile platform 115 may determine selection of one or more media signals. For example, if a first media signal captures one user's voice clearly but a second user's voice is muffled, the manager 109 may select a second media signal that clearly captures the second user's voice to combine with the first media signal. Together, the two media signals may form a composite that renders a coherent rendering of the conversation between the two users. Furthermore, the manager 109 may process the media signals to mask noise, such as background noise or other participants. Such a composite signal is thus generated according to the preference information provided by profile platform 115.

In another embodiment, manager 109 may retrieve preference information from, for instance, the profile platform 115, wherein the composite signal is generated according to the preference information. For example, a user or subscriber may set his/her preference information to dictate that audio components of composite signals can be low quality, but the visual aspect must be particularly vivid. As a result, the composite may be generated from media signals that yield the most high-definition image, while sound quality is a secondary concern. Based on this embodiment, multiple composites may be generated from a single set of media signals, since the composite signals may be processed in various ways. Processing received media signals according to different preference information is only one way that manager 109 may select one or more of the received media signals according to different criterion to generate another composite signal.

In yet another embodiment, preference module 209 may set a preference to receive media signals only from devices at the same location, for instance in the situation of capturing a meeting. In this scenario, manager 109 may transmit a signal to mobile devices 101 to verify device location, or manager 109 may assess mobile device location data using composite media processing platform 117. The composite signal then may be formed using GPS clock technology to synchronize received signals.

In creating such a composite, manager 109 and separate communication device, profile platform 115, may process one or more or the received media signals to form the composite signal (steps 407 and 409). Aside from (or in addition to) processing media signals according to preference information criterion, step 407 of processing the one or more received media signals may include selecting one or more of the received media signals according to other means. In one embodiment, users may manually define criterion for selection of media signals, at any point before, during, or after the session to affect generation of the composite signal. Alternately, as previously discussed, preference module 209 and selection module 211 may carry different, pre-set selection criterion. In a further embodiment, media signals from multiple devices may be processed to generate or allow overlays, for example, permitting, at least in part, advertisements, subtitles, overlaid scenes to give the impression of continuous footage, subtitles, or a combination thereof. Resultant composite signals may, at least in part, be written into a format for later playback, transmitted to a remote destination, stored, or a combination thereof.

In another further embodiment, processing the one or more received media signals may include monitoring transmissions associated with the one or more media signals, and selecting one or more of the received media signals, based on the monitored transmissions. In other words, selection of signals may be dynamic so that a composite signal may be generated in real time.

Figure 5:
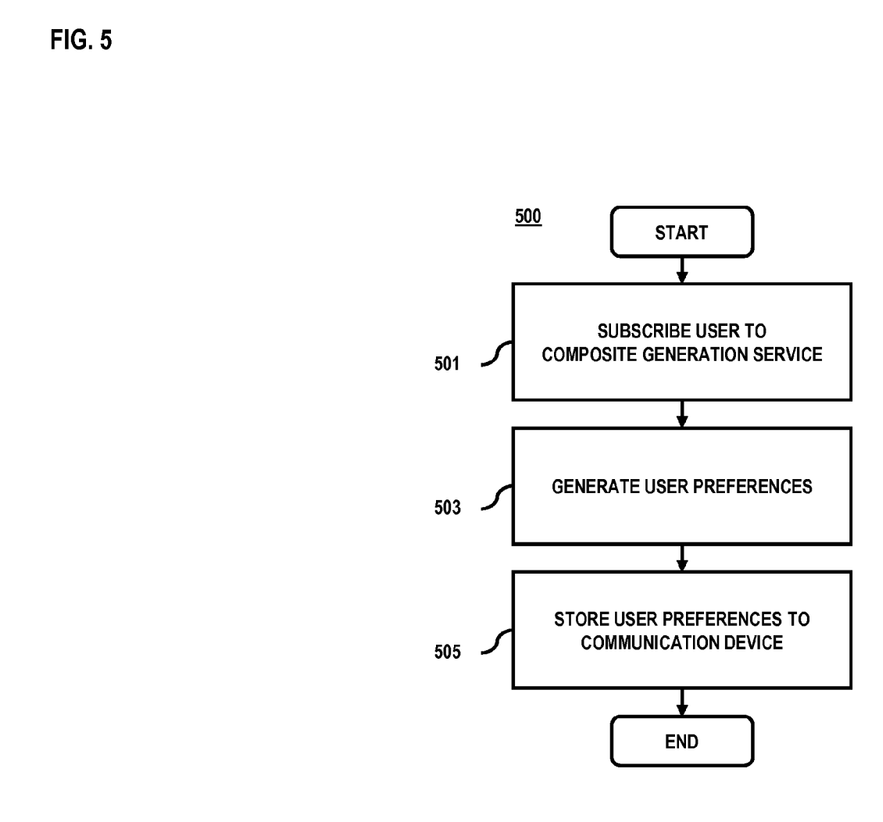
FIG. 5 is a flowchart for setting preference information for generating a composite signal, according to an exemplary embodiment.

FIG. 5 is a flowchart of a process 500 for selecting preference information for the composite signal. At step 501, manager 109 may subscribe a user associated with one or more mobile devices (e.g. mobile device 101) to the composite signal generation service. According to one embodiment, the user may subscribe utilizing any suitable client device capable of processing and transmitting information over one or more networks of 107 and 111. Namely, the user may interact with an input interface (e.g., a keyboard, interactive voice response (IVR) interface, etc.) of, for example, the profile platform 115 to activate software resident on the mobile devices 101 and profile platform 115, such as a GUI or other networked application that interfaces with (or is implemented by) manager 109. In one embodiment, subscribing to the composite generation service permits a compilation of a user profile to be constructed.

In step 503, the user may generate user preferences. In one embodiment, step 503 may include the user selecting preferences by interacting with an input interface as described above. In step 505, the user preference information is stored to a communication device, such as the profile platform 115, so that it may be accessed when a composite signal is to be generated.

Figure 6:
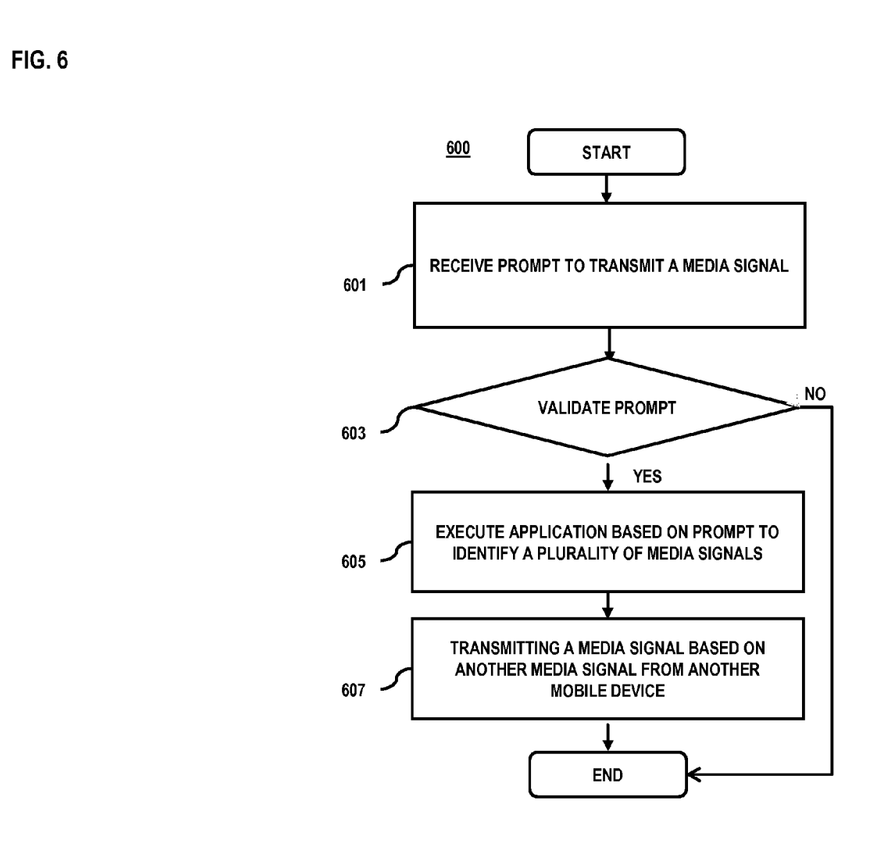
FIG. 6 is a flowchart for a mobile device transmitting a media signal for generation of a composite signal, according to an exemplary embodiment.

FIG. 6 is a flowchart of a process 600 from the standpoint of a mobile device initiating a signal transmission for the purpose of generating a composite signal. At step 601, a mobile device 101 may receive a prompt to transmit a media signal. That is, a user via, for example, mobile device 101 may enter a communication, media signal transmission session with manager 109, such as by "logging on" to a networked portal or application provided by, for instance, communication interface 201. It is noted that before gaining access, the user may optionally be required to provide credential information, such as a username and password combination, especially if the user has an account in the user profiles repository 215. If so, in one embodiment, "logging on" may provide continuity in the user profiles repository 215 such that composite signal generation may be increasingly tailored in accordance to some aspect stored in the user profiles repository 215 from previous sessions. Upon entering the portal, pooling application 103 may activate media input 105 to prepare for transmission of media signals.

Once "logged on," manager 109 may perform step 603 of validating the prompt. For step 603, manager 109 may give the user the option to participate or not participate in media signal collection and transmittal for generating a composite signal. In one embodiment, manager 109 may perform this step by prompting the user with one or more GUIs, menus, options, selections, etc., enabling the user to approve activation of a composite signal generation application. According to certain embodiments, registration procedures may prompt the user to identify other mobile devices 101 that the user may wish to be associated with in receiving media signals.

Should a user elect to participate in collecting the media signals for a composite signal, the manager 109 may execute the pooling application 103 based on the prompt from manager 109. Executing the application may cause the manager 109 and data collection module 207 to act on step 605 of executing an application to identify a plurality of media signals, then selecting the media signal to be delivered by mobile device 101a. As discussed previously, a media signal may be chosen from each mobile device based, at least in part, on threshold criterion stored in the selection module 211, pre-set user preference information stored in the profile platform 115 or user profiles repository 215, or a combination thereof.

At step 607, the sampling module 213 may transmit a media signal based on the media signal (prompted) and another media signal from another mobile device. In doing so, the media signal transmitted is contingent on media signals delivered from other mobile device(s) such that the mobile device acts as one portion of a composite-building set of mobile devices. Media signal input from various mobile devices may be then integrated into a composite signal. Furthermore, step 607 may include presenting the media signal to a communication device that is separate from the plurality of mobile devices to generate a composite. In one embodiment, profile platform 115 may be one such communication device. This means that certain preference information may be retrieved from the communication device to govern the making of the composite signal.

Figure 7:
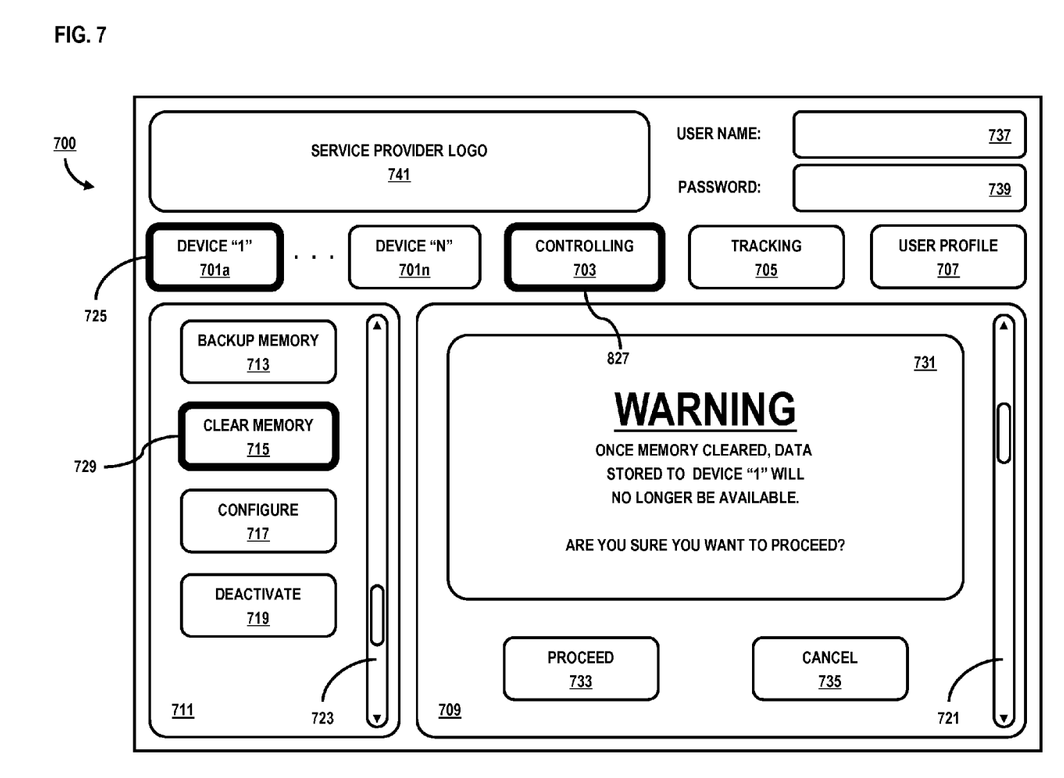
FIG. 7 is a graphical user interface for generating a composite signal, according to an exemplary embodiment.

FIG. 7 is a graphical user interface for remotely controlling or configuring a mobile device, according to an exemplary embodiment. In this example, GUI 700 is provided to a user of the remote control and tracking services of system 100 by manager 109 via, for instance, communication interface 201 working with preference module 209. It is assumed that the user has previously registered one or more devices, e.g., devices 101, with the remote control and tracking services of system 100. Hence, GUI 700 includes a plurality of "tabs" (or interactive interface elements) 701a-701n corresponding to registered devices of (or associated with) the user. Further, main feature tabs, e.g., "CONTROLLING" tab 703, "TRACKING" tab 705, and "USER PROFILE" tab 707 are provided for accessing the "main" remote controlling and tracking features or functionalities of manager 109.

Accordingly, selection of (or any other suitable interaction with) controlling tab 703 toggles region 709 to an "active" controlling region 709, providing a control feature or function associated with a particular device. For instance, selection of (or any other suitable interaction with) a particular one of tabs 701a-701n toggles "active" control region 709 between controlling "DEVICE '1,'" "DEVICE '2,'" ... "DEVICE 'N.'" That is, selection of, for example, tab 701a toggles "active" controlling region 709 to present a control feature or function capable of being configured for "DEVICE '1.'" It may also be the case that interacting with controlling tab 703 causes a features (or functions) region 711 to be populated with one or more "available" control features region 711 providing one or more available remote control and/or tracking features to the user, such as a "BACKUP MEMORY" feature 713, a "CLEAR MEMORY" feature 715, a "CONFIGURE" feature 717, a "DEACTIVATE" feature 719, etc. In other embodiments, features region 711 may include a navigation tree, an expandable table of contents, or for example FlashMedia presentation of selectable entries, as well as other equivalent listings, menus, options, etc. The content of respective regions (e.g., regions 709 and 711) may be dynamically updated based on one or more selections of features 713-719.

Accordingly, selection of feature 713 enables the user to image or back up one or more memories (e.g., memory 329) of mobile device 300, whereas selection of feature 715 allows the user to clear the one or more memories, such as to purge the device of unneeded stored media signals. Interaction with feature 717 enables the user to configure one or more features or functions of the actively controlled device, such as configuring a ringtone, operating state, display setting, etc., of mobile device 300.

GUI 700 provides navigational elements/fields, e.g., scrollbars 721 and 723, to indicate the existence of additional information, entries, fields, etc., not displayed, but navigably available, as well as facilitate interface usability. Accordingly, the user may browse to additional information, entries, fields, etc., via, for instance, an input interface of a suitable client device (e.g., computing device 119), e.g., a cursor control. One or more fixed focus states (e.g., borders 725, 727, and 729) and/or distinctive magnification features, e.g., color, brightness, bolding, font type, text size, etc., may be used to convey the device being "currently" controlled, as well as those remote control and/or tracking features being "currently" employed to remotely control and/or track the particular device.

As seen in FIG. 7, feature 715 has been selected, which is denoted by fixed focus state 729. Accordingly, controlling region 709 provides one or more menus, options, instructions, buttons, etc., for clearing (or otherwise erasing) a memory of the device being currently controlled. For instance, region 709 provides an instruction region 731 informing the user that once the memory of the device is erased, the information will no longer be available. As such, interaction with interactive element 733 carries out the erasing function and, thereby, purges the device being controlled of unneeded stored signals, whereas interaction with interactive element 735 cancels the clear memory feature. Similar instruction regions, interactive elements, input fields, etc., may be provided for features 713, 717, and 719.

Moreover GUI 700 also includes various regions, such as a user name region 737 and a password region 739 for enabling users to "log on" and obtain access to the features and functionalities of GUI 700 and/or platform 117. In alternative embodiments, regions 737 and 739 may be configured to correspond to other associated authentication information. It is noted that a "WELCOME, USERNAME" message may be presented to authenticated users once sufficient authentication (or authorization) information is input to regions 737 and/or 739. Still further, GUI 700 may include a service provider logo region 741 to illustrate (or otherwise present) the user with a logo of the service provider of the remote control and tracking services of system 100, as well as include other suitable (or equivalent) regions, such as an advertisement region (not shown), etc.

Figure 8:
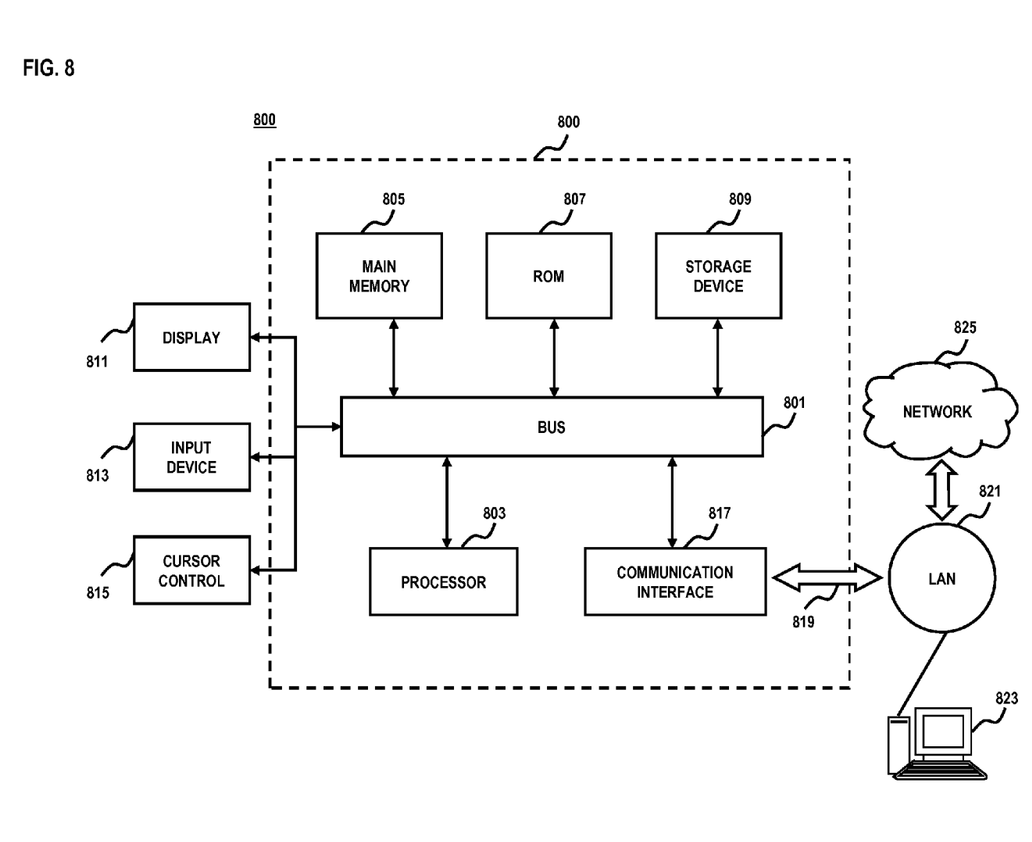
FIG. 8 is a diagram of a computer system that can be used to implement various exemplary embodiments.

FIG. 8 illustrates computing hardware (e.g., computer system) 800 upon which exemplary embodiments can be implemented. The computer system 900 includes a bus 801 or other communication mechanism for communicating information and a processor 803 coupled to the bus 801 for processing information. The computer system 800 also includes main memory 805, such as a random access memory (RAM) or other dynamic storage device, coupled to the bus 801 for storing information and instructions to be executed by the processor 803. Main memory 805 can also be used for storing temporary variables or other intermediate information during execution of instructions by the processor 803. The computer system 800 may further include a read only memory (ROM) 807 or other static storage device coupled to the bus 801 for storing static information and instructions for the processor 803. A storage device 809, such as a magnetic disk or optical disk, is coupled to the bus 801 for persistently storing information and instructions.

The computer system 800 may be coupled via the bus 801 to a display 811, such as a cathode ray tube (CRT), liquid crystal display, active matrix display, or plasma display, for displaying information to a computer user. An input device 813, such as a keyboard including alphanumeric and other keys, is coupled to the bus 801 for communicating information and command selections to the processor 803. Another type of user input device is a cursor control 815, such as a mouse, a trackball, or cursor direction keys, for communicating direction information and command selections to the processor 803 and for controlling cursor movement on the display 811.

According to an exemplary embodiment, the processes described herein are performed by the computer system 800, in response to the processor 803 executing an arrangement of instructions contained in main memory 805. Such instructions can be read into main memory 805 from another computer-readable medium, such as the storage device 809. Execution of the arrangement of instructions contained in main memory 805 causes the processor 803 to perform the process steps described herein. One or more processors in a multi-processing arrangement may also be employed to execute the instructions contained in main memory 805. In alternative embodiments, hard-wired circuitry may be used in place of or in combination with software instructions to implement exemplary embodiments. Thus, exemplary embodiments are not limited to any specific combination of hardware circuitry and software.

The computer system 800 also includes a communication interface 817 coupled to bus 801. The communication interface 817 provides a two-way data communication coupling to a network link 819 connected to a local network 821. For example, the communication interface 817 may be a digital subscriber line (DSL) card or modem, an integrated services digital network (ISDN) card, a cable modem, a telephone modem, or any other communication interface to provide a data communication connection to a corresponding type of communication line. As another example, communication interface 817 may be a local area network (LAN) card (e.g. for Ethernet™ or an Asynchronous Transfer Model (ATM) network) to provide a data communication connection to a compatible LAN. Wireless links can also be implemented. In any such implementation, communication interface 817 sends and receives electrical, electromagnetic, or optical signals that carry digital data streams representing various types of information. Further, the communication interface 817 can include peripheral interface devices, such as a Universal Serial Bus (USB) interface, a PCMCIA (Personal Computer Memory Card International Association) interface, etc. Although a single communication interface 817 is depicted in FIG. 8, multiple communication interfaces can also be employed.

The network link 819 typically provides data communication through one or more networks to other data devices. For example, the network link 819 may provide a connection through local network 821 to a host computer 823, which has connectivity to a network 825 (e.g. a wide area network (WAN) or the global packet data communication network now commonly referred to as the "Internet") or to data equipment operated by a service provider. The local network 821 and the network 825 both use electrical, electromagnetic, or optical signals to convey information and instructions. The signals through the various networks and the signals on the network link 819 and through the communication interface 817, which communicate digital data with the computer system 800, are exemplary forms of carrier waves bearing the information and instructions.

The computer system 800 can send messages and receive data, including program code, through the network(s), the network link 819, and the communication interface 817. In the Internet example, a server (not shown) might transmit requested code belonging to an application program for implementing an exemplary embodiment through the network 825, the local network 821 and the communication interface 817. The processor 803 may execute the transmitted code while being received and/or store the code in the storage device 809, or other non-volatile storage for later execution. In this manner, the computer system 800 may obtain application code in the form of a carrier wave.

The term "computer-readable medium" as used herein refers to any medium that participates in providing instructions to the processor 803 for execution. Such a medium may take many forms, including but not limited to non-volatile media, volatile media, and transmission media. Non-volatile media include, for example, optical or magnetic disks, such as the storage device 809. Volatile media include dynamic memory, such as main memory 805. Transmission media include coaxial cables, copper wire and fiber optics, including the wires that comprise the bus 801. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the exemplary embodiments may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
    receiving a plurality of media signals over a wireless communication network from a plurality of mobile devices;
    receiving spatial positioning information corresponding to a location of one or more mobile devices providing the one or more of the received media signals;
    receiving capability specifications from each of the plurality of mobile devices specifying a capability of each mobile device to generate a respective one of the plurality of media signals that is received;
    selecting one or more of the received media signals based on the capability specifications and according to a criterion; and
    generating a composite signal from the selected media signals,
    wherein the criterion includes, at least in part, camera type, focal length, microphone quantity, Global Positioning System (GPS) sensitivity, accelerometer, or a combination thereof, and
    wherein the spatial positioning information is overlaid a depiction of a geographic area to indicate a location of the one or more mobile devices in the geographic area.

2. A method according to claim 1, further comprising:
    presenting the composite signal to a communication device that is separate from the plurality of mobile devices.

3. A method according to claim 2, further comprising:
    receiving input from the communication device, wherein the input is utilized to select one or more of the media signals.

4. A method according to claim 2, further comprising:
    retrieving preference information associated with the communication device, wherein the composite signal is generated according to the preference information.

5. A method according to claim 1, further comprising:
    processing one or more of the received media signals to form the composite signal.

6. A method according to claim 1, further comprising:
    selecting one or more of the received media signals according to a different criterion to generate another composite signal.

7. A method according to claim 4, wherein preference information includes, at least in part, lighting specifications, sound quality, or a combination thereof.

8. A method according to claim 1, further comprising:
    monitoring transmissions associated with the one or more media signals,
    selecting one or more of the received media signals, based on the monitored transmissions.

9. An apparatus comprising:
    at least one processor; and
    at least one memory including computer program code,
    the at least one memory and the computer program code configured to, with the at least one processor, cause the apparatus to perform at least the following,
        receive a plurality of media signals over a wireless communication network from a plurality of mobile devices;
        receive spatial positioning information corresponding to a location of one or more mobile devices providing the one or more of the received media signals;
        receive capability specifications from the plurality of mobile devices specifying a capability of each mobile device to generate a respective one of the plurality of media signals that is received;
        select one or more of the received media signals based on the capability specifications and according to a criterion; and
        generate a composite signal from the selected media signals,
        wherein the criterion includes, at least in part, camera type, focal length, microphone quantity, Global Positioning System (GPS) sensitivity, accelerometer, or a combination thereof, and
        wherein spatial positioning information is overlaid a depiction of a geographic area to indicate a location of the one or more mobile devices in the geographic area.

10. An apparatus according to claim 9, wherein the apparatus is further caused, at least in part, to:
    present the composite signal to a communication device that is separate from the plurality of mobile devices.

11. An apparatus according to claim 9, wherein the apparatus is further caused, at least in part, to:
    receive input from the communication device, wherein the input is utilized to select one or more of the media signals.

12. An apparatus according to claim 9, wherein the apparatus is further caused, at least in part, to:
    retrieve preference information associated with the communication device, wherein the composite signal is generated according to the preference information.

13. An apparatus according to claim 9, wherein the apparatus is further caused, at least in part, to:
    process one or more of the received media signals to form the composite signal.

14. An apparatus according to claim 9, wherein the apparatus is further caused, at least in part, to:
    select one or more of the received media signals according to a different criterion to generate another composite signal.

15. An apparatus according to claim 9, wherein preference information includes, at least in part, lighting specifications, sound quality, or a combination thereof.

16. An apparatus according to claim 9, wherein the apparatus is further caused, at least in part, to:
    monitor transmissions associated with the one or more media signals,
    select one or more of the received media signals according to a criterion, based on the monitored transmissions.

* * * * *